United States Patent [19]
Wallace

[11] Patent Number: 5,633,816
[45] Date of Patent: May 27, 1997

[54] RANDOM NUMBER GENERATOR WITH WAIT CONTROL CIRCUITRY TO ENHANCE RANDOMNESS OF NUMBERS READ THEREFROM

[75] Inventor: William C. Wallace, Dallas, Tex.

[73] Assignee: National Semiconductor Corporation, Santa Clara, Calif.

[21] Appl. No.: 523,002

[22] Filed: Sep. 1, 1995

[51] Int. Cl.$^6$ ........................................... G06F 7/38
[52] U.S. Cl. ............... 364/717; 364/717.5; 364/715.08; 395/182.02; 395/457
[58] Field of Search ............... 364/717, 717.15, 364/715.08; 395/182.02, 457; 342/51

[56] References Cited

U.S. PATENT DOCUMENTS

| | | | |
|---|---|---|---|
| 3,675,217 | 7/1972 | Dauber et al. | 395/457 |
| 3,790,768 | 2/1974 | Chevalier et al. | 364/717 |
| 4,451,916 | 5/1984 | Casper et al. | 395/182.02 |
| 4,545,024 | 10/1985 | Maher et al. | 364/717 |
| 4,853,884 | 8/1989 | Brown et al. | 364/717 |
| 4,905,176 | 2/1990 | Schulz | 364/717 |
| 5,525,994 | 6/1996 | Hurta et al. | 342/51 |

OTHER PUBLICATIONS

*Applied Cryptography, Protocals, Algorithms and Source Code in C* Bruce Schneier, John Wiley and Sons, Inc., copyright 1994 U.S.A., pp. 351-356.

Primary Examiner—Paul P. Gordon
Assistant Examiner—Ramesh Patel
Attorney, Agent, or Firm—Limbach & Limbach L.L.P.

[57] ABSTRACT

A random number generator circuit for generating a sequence of random numbers. A linear feedback shift register includes shift register circuitry that holds a plurality of shift register bits. The shift register circuitry shifts the shift register bits responsive to a periodic system clock signal, shifting out one of the shift register bits while shifting in a feedback bit whose value is provided at a feedback input of the shift register. Tap circuitry generates the feedback bit by logically combining selected ones of the shift register bits. Sampling circuitry provides at least a portion of the shift register bits as one of the sequence of random numbers. Interface circuitry provides a random number from the shift register, to a processor via a processor bus, in response to a processor request signal being asserted. Significantly, the interface circuitry includes wait control circuitry that receives the asserted processor request signal and that inserts wait states onto the processor bus if the asserted processor request signal occurs less than a minimum number of periods of the system clock signal from a previous asserted processor request signal. Preferably, the "minimum number of periods" is determined from a register which is programmable by the processor. Thus, the randomness of the sequence produced by the linear feedback shift register is enhanced in those situations where the processor requests random numbers close together in time.

3 Claims, 3 Drawing Sheets

RANDOM NUMBER GENERATOR WITH WAIT CONTROL CIRCUITRY TO ENHANCE RANDOMNESS OF NUMBERS READ THEREFROM

TECHNICAL FIELD OF THE INVENTION

The present invention relates to random number generators and, in particular, to a random number generator which includes wait control circuitry that enhances the randomness of data read therefrom.

BACKGROUND OF THE INVENTION

Random number generators are well-known in the art. One conventional random number generator 100, illustrated in block form in FIG. 1, employs a linear feedback shift register (LFSR) circuit 101. Referring to FIG. 1, it can be seen that the LFSR circuit 101 illustrated therein holds sixteen bits, denoted (from least significant to most significant) as $b_1$ through $b_{16}$. In response to transitions of a periodic clock signal SYSCLK provided at a clock input of the LFSR circuit 101, the bits held in the LFSR are shifted right. During the shift right, a "feedback" bit (designated in FIG. 1 as $b_f$) replaces the most significant bit ($b_{16}$) and the least significant bit ($b_1$) is discarded. When a random number is needed (e.g., by a processor), the bits then in the LFSR circuit 101 are read, via a sixteen bit local bus 104, as the random number.

As is well-known in the art, the random property of the bit values in the LFSR circuit 101 is due to tap circuitry 102 used to generate the feedback bit $b_f$. That is, particular ones of the bits held in the LFSR circuit 101 are provided to, and are combined by, combinatorial logic circuitry 106 (e.g., XOR circuitry) to determine the value of the feedback bit $b_f$. In the example of FIG. 1, bits $b_{15}$ and $b_3$ are combined to determine the value of the feedback bit $b_f$. Also, although not shown in FIG. 1, the combinatorial logic circuitry may also combine the unstable outputs of ring oscillators in order to further randomize the random number sequence.

However, a problem with the conventional random number generator 100 of FIG. 1 is that a sequence of numbers read from the LFSR 101 will not be sufficiently random unless enough SYSCLK periods have passed between each read from the LFSR circuit 101.

SUMMARY OF THE INVENTION

The present invention is a random number generator circuit for generating a sequence of random numbers. A linear feedback shift register includes shift register circuitry that holds a plurality of shift register bits. The shift register circuitry shifts the shift register bits responsive to a periodic system clock signal, shifting out one of the shift register bits while shifting in a feedback bit whose value is provided at a feedback input of the shift register. Tap circuitry generates the feedback bit by logically combining selected ones of the shift register bits. Sampling circuitry provides at least a portion of the shift register bits as one of the sequence of random numbers.

Interface circuitry provides a random number from the shift register, to a processor via a processor bus, in response to a processor request signal being asserted. Significantly, the interface circuitry includes wait control circuitry that receives the asserted processor request signal and that inserts wait states onto the processor bus if the asserted processor request signal occurs less than a minimum number of periods of the system clock signal from a previous asserted processor request signal. Preferably, the "minimum number of periods" is determined from a register which is programmable by the processor. Thus, the randomness of the sequence produced by the linear feedback shift register is enhanced in those situations where the processor requests random numbers close together in time.

A better understanding of the features and advantages of the invention will be obtained by reference to the following detailed description and accompanying drawings which set forth an illustrative embodiment in which the principles of the invention are utilized.

DETAILED DESCRIPTION

Figure 1:
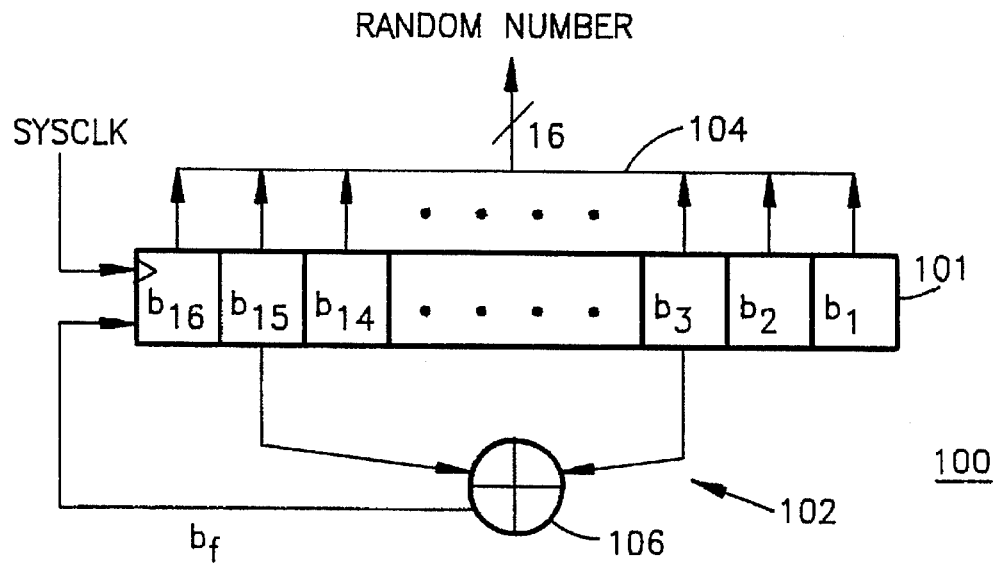
FIG. 1 is a block diagram illustrating a conventional random number generator circuit.
Figure 2:
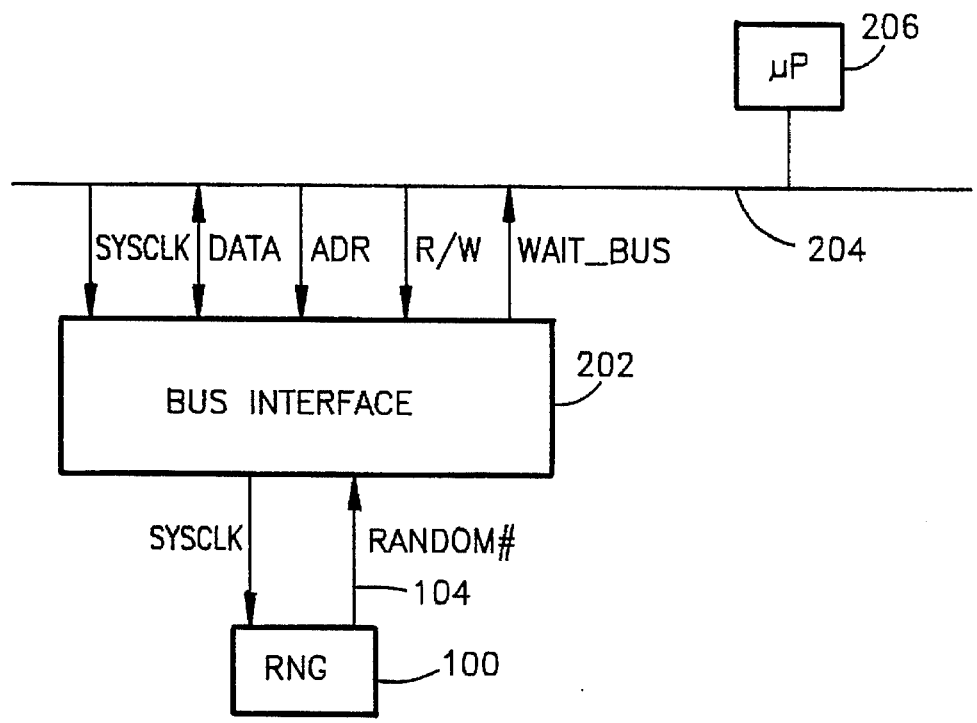
FIG. 2 is a random number generator in accordance with an embodiment of the present embodiment.

Referring now to FIG. 2, a random number generator circuit 100 (e.g., the conventional random number generator circuit illustrated in FIG. 1) generates random numbers responsive to transitions of a periodic system clock signal SYSCLK. A bus interface circuit 202 provides an interface between a processor bus 204 and the local bus 104 of a random number generator circuit 100 to provide random numbers to a processor 206 upon request by the processor 206.

Signal lines between the bus interface circuit 202 and the processor bus 204 are described in the following table:

TABLE 1

| BUS SIGNALS | |
| --- | --- |
| SYSCLK | A periodic system clock siqlnal. This signal is passed by the bus interface circuit 202 to the random number generator 100 unchanged. |
| DATA | A bidirectional line for transfer of data into bus interface 202 control register and for transfer of random number data out of the random number generator 100. |
| ADR | Address signals generated by the processor 206. |
| R/W | Control line that signifies whether the address on the ADR line is a read address or a write address. |
| WAIT_BUS | When asserted by the bus interface 202, inserts wait states onto the processor bus 204. |

The WAIT_BUS signal is of particular significance to the present invention. The significance of the WAIT_BUS signal can be seen with respect to FIG. 3, which illustrates the bus interface circuit 202 in block form. In addition, FIG. 4 is a state diagram which illustrates the operation of the wait control circuitry 304 of the bus interface circuit 202.

Figure 3:
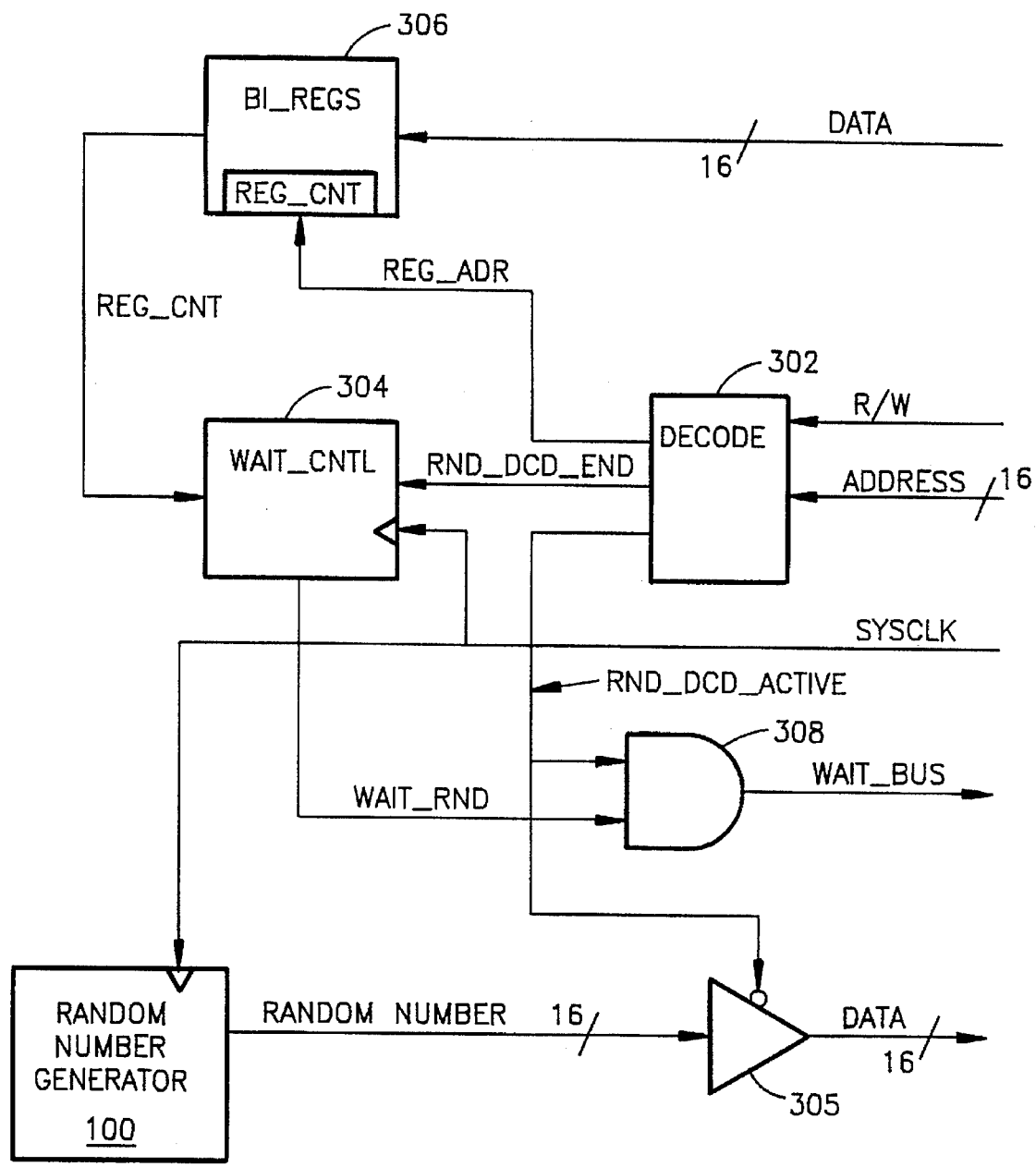
FIG. 3 is a block diagram illustrating the bus interface circuit of FIG. 2.

Referring first to FIG. 3, the processor 206 requests a random number from the random number generator 100 by providing an address signal, corresponding to the address of the random number generator 100, onto the ADR signal portion of the processor bus 204. A decode circuit 302 recognizes the address and asserts a RND_DCD_ACTIVE control signal in response. The decode circuit 302 provides the RND_DCD_ACTIVE control signal to AND circuitry 308, where the RND_DCD_ACTIVE signal is AND'ed with a WAIT_RND signal generated by a WAIT_CNTL circuit 304. When the WAIT_RND signal and the RND_DCD_ACTIVE signal are both asserted, the WAIT_BUS signal is provided from the AND circuitry 308.

As discussed in detail below with reference to FIG. 4, the WAIT_CNTL circuit 304 receives the system clock signal SYSCLK. In addition, the decode circuit 302 provides a signal RND_DCD_END which is asserted at the end of a read cycle of the random generator. The RND_DCD_ACTIVE signal also enables a drive circuit 305 to drive the random number from the random number generator circuit 100 onto the data lines of the processor bus 204.

Figure 4:
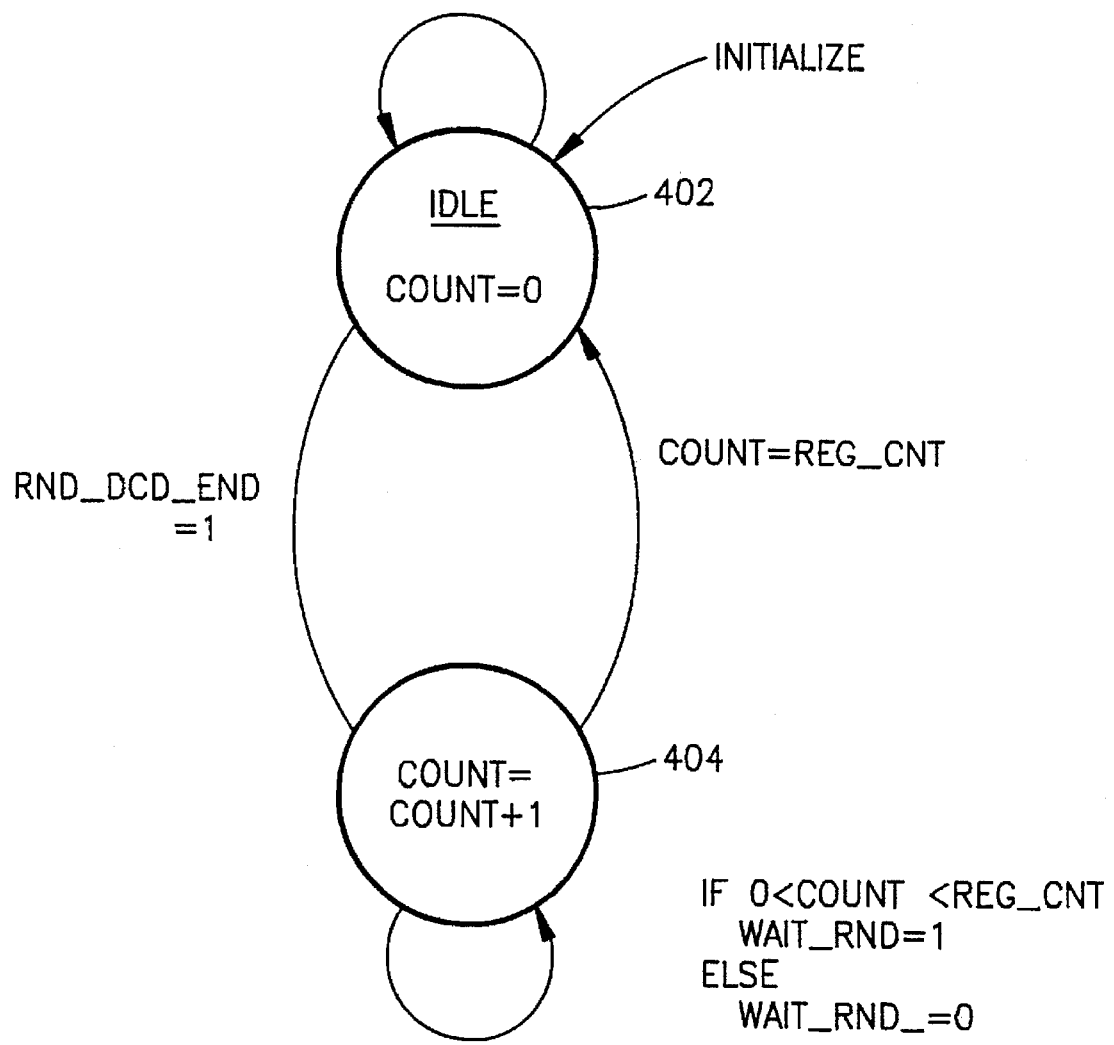
FIG. 4 is a state diagram which illustrates the operation of the wait control circuitry of FIG. 3.

The WAIT_CNTL circuit 304 operates as shown in the state diagram of FIG. 4. When the bus interface circuit 202 is first initialized, the WAIT_CNTL circuit 304 enters into state 402. There, a local variable named COUNT is initialized to zero. The WAIT_CNTL circuit 304 stays in state 402 until the end of a random generator read cycle, as indicated by RND_DEC_END being asserted by the decode circuit 302.

At this point, the WAIT_CNTL circuit 304 moves to state 404, at which the WAIT_CNTL circuit 304 asserts the WAIT_RND signal. Thus, while the WAIT_CNTL circuit remains at state 404, wait states will be inserted onto the processor bus 204 if the address of the random number generator 100 is provided on the ADR signal portion of the processor bus 204 by the processor 206. The WAIT_CNTL circuit 304 remains in state 404 until REG_CNT number of cycles of the system clock SYSCLK pass. That is, at each cycle of the system clock SYSCLK, the local variable COUNT is incremented and the WAIT_CNTL circuit 304 moves back to state 402 only when COUNT becomes equal to REG_CNT. At this point, no wait states will be inserted onto the processor bus 204 if the processor 206 attempts to read a random number from the random number generator 100.

REG_CNT is obtained by the WAIT_CNTL circuit 304 from a programmable (by the processor 206) register within a bus interface register circuit 306 (denoted as "BI_REGS" in FIG. 3). Referring again to FIG. 3, it is now discussed how the processor 206 programs the REG_CNT register of the BI_REGS circuit 306. To do this, the processor 206 merely places the desired REG_CNT value on the data lines of the processor bus 204 while placing the address of the REG_CNT register on the address lines of the processor bus 204 and while placing the R/W signal of the processor bus in the "Write" state. This can be accomplished, for example, by conventional memory mapped I/O. The decode circuit 302 recognizes the address of the REG_CNT register and asserts a REG_ADR control line to the BI_REGS register circuit 306. In response, the BI_REGS register circuit 306 reads the READ_CNT value off of the data lines of the processor bus 204.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A random number generator system for generating a sequence of random numbers, comprising:

a linear feedback shift register, that includes shift register circuitry that holds a plurality of shift register bits and that, responsive to transitions of a periodic system clock signal, shifts said shift register bits, shifting out one of said shift register bits while shifting in a feedback bit whose value is provided at a feedback input of the shift register;

tap circuitry that generates the feedback bit; and sampling circuitry that provides at least a portion of said shift register bits as one of said sequence of random numbers; and interface circuitry that provides said one of said sequence of random numbers to a processor in response to a processor request signal being asserted, wherein the processor request signal is for requesting the sampling circuitry to provide a random number, said interface circuitry including wait control circuitry that receives said asserted processor request signal and that inserts wait states onto the processor bus if the asserted processor request signal occurs less than a minimum number of periods of the system clock signal from a previous asserted processor request signal.

2. The random number generator circuit of claim 1, and further comprising a programmable count register, wherein said minimum number of periods of the system clock signal is determined from a value in said programmable count register.

3. A random number generator system for generating a sequence of random numbers, comprising:

number generator circuitry that generates numbers, in sequence, responsive to transitions of a periodic system clock signal, the number generator circuitry including sampling circuitry that provides one of the generated numbers as one of said sequence of random numbers; and interface circuitry that provides said one of said sequence of random numbers to a processor in response to a processor request signal being asserted, wherein the processor request signal is for requesting the sampling circuitry to provide a random number, said interface circuitry including wait control circuitry that receives said asserted processor request signal and that inserts wait states onto the processor bus if the asserted processor request signal occurs less than a minimum number of periods of the system clock signal from a previous asserted processor request signal.

\* \* \* \* \*